United States Patent [19]

Kobayashi et al.

[11] Patent Number: 5,117,947
[45] Date of Patent: Jun. 2, 1992

[54] DISK BRAKE FRICTION PAD WEAR SENSOR

[75] Inventors: Kinzo Kobayashi, Kanagawa; Yoshikazu Gamoh, Yamanashi, both of Japan

[73] Assignee: Tokico, Ltd., Kanagawa, Japan

[21] Appl. No.: 608,484

[22] Filed: Nov. 1, 1990

[30] Foreign Application Priority Data

Nov. 2, 1989 [JP] Japan .............................. 1-128482[U]
Mar. 20, 1990 [JP] Japan .............................. 2-28436[U]

[51] Int. Cl.⁵ ............................................. F16D 66/02
[52] U.S. Cl. .................................... 188/1.11; 116/208
[58] Field of Search ...................... 188/1.11; 340/454; 116/208

[56] References Cited

U.S. PATENT DOCUMENTS

| | | | |
|---|---|---|---|
| 3,976,167 | 8/1976 | Hirai et al. | 188/1.11 |
| 4,037,689 | 7/1977 | Maehara | 188/1.11 |
| 4,124,105 | 11/1978 | Maehara | 188/1.11 |
| 4,241,327 | 12/1980 | Yamamoto | 188/1.11 X |
| 4,460,067 | 7/1984 | Katagiri et al. | 188/1.11 |
| 4,498,559 | 2/1985 | Katagiri et al. | 188/1.11 |
| 4,745,992 | 5/1988 | Lusa | 188/1.11 |

FOREIGN PATENT DOCUMENTS 61-117933  7/1986  Japan .

Primary Examiner—Joseph F. Peters, Jr.
Assistant Examiner—Carla Mattix
Attorney, Agent, or Firm—Wenderoth, Lind & Ponack

[57] ABSTRACT

A disc brake includes a rotating disc, a friction pad having a backing plate and a lining fixedly attached to one surface of the backing plate, and a wear sensor for sensing a limit of wear of the lining. The wear sensor is a bent elongate metal plate mounted on the backing plate with one end thereof projecting beyond the front surface of the backing plate. The disc brake is further provided with structure for preventing excessive deflection of the sensor.

12 Claims, 6 Drawing Sheets

DISK BRAKE FRICTION PAD WEAR SENSOR

BACKGROUND OF THE INVENTION

1. Field of the Invention

The present invention relates to a disc brake for use in a vehicle such as an automobile, and, more particularly, to a disc brake having a wear sensor or sensing member for providing a warning when the lining of a friction pad of the disc brake has become worn.

2. Prior Art

A disc brake typically comprises a pair of friction pads which are respectively positioned on the opposite sides of a disc fixedly mounted on a wheel axle. The friction pads are adapted to be forcedly pressed onto the disc to generate a braking force. A typical friction pad comprises a backing plate and a lining adhered to the backing plate.

Since the lining becomes worn as the brake is actuated, the friction pad must be replaced when the lining has been worn to a certain extent. A friction pad has been provided with a wear sensing member or sensor for indicating when the lining has been worn to its limit and that it is time for the friction pad to be replaced.

FIG. 1 is a plan view showing one example of a disc brake comprising a pair of friction pads each provided with a wear sensor as mentioned above.

Reference numeral 1 designates a rotating disc mounted on a wheel axle (not shown) to rotate therewith. On the opposite sides of the disc 1 are positioned inner and outer friction pads 2a and 2b, respectively. The friction pads 2a and 2b respectively comprise backing plates 3a, 3b and linings 4a, 4b adhered to the backing plates 3a, 3b, respectively. It is usual practice to use the same type of friction pad for both the inner and outer friction pads. Shown at 5a and 5b are wear sensors respectively mounted on the inner and outer friction pads 2a and 2b. The wear sensors 5a and 5b are fixedly secured to the rear surfaces of backing plates 3a, 3b of the respective friction pads 2a, 2b at respective one ends or base portions 6a, 6b thereof by means of rivets and the like. Respective sensing ends 7a, 7b of the sensor 5a, 5b extend over the sides of the backing plates 3a, 3b and protrude beyond the front surfaces of the backing plates by a predetermined length. In the disc brake provided with the arrangement described above, when, for example, the lining 4a has been worn to a predetermined width, the sensing end 7a of the sensor 5a contacts and is drawn by the disc 1, so that the sensor 5a vibrates and generates a noise, thereby providing a warning. When the lining 4b has been worn to the predetermined width, the sensor 5b provides a warning.

However, it should be noted that the linings 4a, 4b are never equally worn in all places over the surface contacting the disc 1. Assuming that the disc 1 rotates in the direction designated by arrow A in FIG. 1 (referred to as a regular rotating direction hereinafter) when the car advances, the lining 4a of the inner pad 2a is worn more at the entrance side (left side as viewed in FIG. 1) than at the exit side (right side as viewed in FIG. 1) while the lining 4b of the outer pad 2b is worn more at the exit side than at the entrance side. In order to enable the sensors 5a, 5b to reliably sense the wear of the lining 4a and 4b, respectively, it is necessary to mount the sensor 5a on the entrance side of the inner pad 2a and the sensor 5b on the exit side of the outer pad 2b. This arrangement also allows the use of the same type of pad with the same type of sensor for both the inner and outer pads.

However, the above-mentioned conventional disc brake suffers from the following problems.

In general, the level and nature of the noise generated by a sensor differs according to the amount of deflection of the sensor. If the amount of deflection is too small or too large, the sensor may not generate a sufficiently loud noise. In the above-mentioned conventional disc brake, the deflection of the sensor 5a for the inner pad 2a is restricted by the side of the backing plate 3a even if the sensor 5a is drawn a great amount by the disc 1 rotating in the regular rotating direction A, while the deflection of the sensor 5b for the outer pad 2b is not restricted by the backing plate 3b. If the sensors 5a, 5b are designed such that the sensor 5a, whose deflection is restricted by the side of the backing plate 3a, the sensor 5a will generate the loudest noise when it is deflected by such a restricted amount, the sensor 5b for the outer pad 2b may not operate appropriately as a wear sensor because the sensor 5b may become deflected beyond the above-mentioned amount of deflection whereby a smaller noise will be generated when it is drawn a great amount by the disc. Further, the sensor 5b of the outer pad 2b may be permanently deformed when it is drawn a great amount because of the absence of any member which acts to restrict excessive defection of the sensor. Once a sensor is permanently deformed, it cannot generate a suitable level of noise.

In order to restrict excessive deflection of the sensor 5b, the sensor 5b may be mounted on the entrance side of the outer pad 2b. In this case, however, a reliable sensing of wear by the sensor 5b cannot be expected because there is only a small amount of wear on the entrance side of the lining 4b of the outer pad 2b as mentioned above. Further, it is impossible to use the same type of pad for both the inner and outer pads, resulting in a raise in production costs of the disc brake.

SUMMARY OF THE INVENTION

Accordingly, an object of the present invention is to provide a disc brake in which permanent deformation of a wear sensor is effectively prevented, thereby assuring that the sensor reliably senses that a lining has been worn to its limit and reliably provides a warning to the driver.

Another object of the present invention is to provide a disc brake in which a wear sensor can generate a warning when a lining of the brake has become worn irrespective of whether the vehicle is driving forwards or in reverse.

The present invention still retains the advantage that the same type of friction pad with the same type of sensor can be used for both the inner and outer pads.

In order to achieve the above-described objects, the present invention provides a friction pad for use in a disc brake and adapted to be forcedly pressed onto a rotating disc to generate a braking force, the friction pad comprising a backing plate provided with an opening extending therethrough, a lining fixedly attached to a front surface of the backing plate and a wear sensor for sensing a wear limit of the lining, the wear sensor being an elongate bent metal plate. The wear sensor is mounted on the backing plate with one end thereof passing through the opening of the backing plate and projecting beyond the front surface of the backing plate. The wear sensor is designed such that the one end of the sensor still projects beyond the front surface of the backing plate when the sensor is deflected into engagement with an edge of the backing plate defining the periphery of said opening.

The present invention also provides a disc brake comprising a rotating disc, a friction pad including a backing plate and a lining fixedly attached to one surface of the backing plate, and a wear sensor for sensing a wear limit of the lining, the sensor being an elongate bent metal plate. The wear sensor is mounted on the backing plate with one end thereof projecting beyond the one surface of the backing plate. The sensor is designed such that the one end is allowed to deflect by substantially equal maximum amounts in opposite directions corresponding to the opposite rotating directions of the disc.

The present invention also provides a friction pad for use in a disc brake and adapted to be forcedly pressed onto a rotating disc to generate a braking force, the friction pad comprising a backing plate and a lining adhered to one surface of the backing plate, and a wear sensor for sensing a wear limit of the lining, the sensor being a bent elongate metal plate. The sensor is mounted on the backing plate with one end thereof projecting beyond the one surface of the backing plate. The maximum deflection of the one end of the sensor in one of opposite directions, corresponding to the opposite rotating directions of the disc, is established by a restricting portion formed on the sensor while the maximum deflection of the one end in the other direction is established by a side of the backing plate. The two maximum amounts of deflection are substantially equal.

DETAILED DESCRIPTION OF THE PREFERRED EMBODIMENTS

Figure 1:
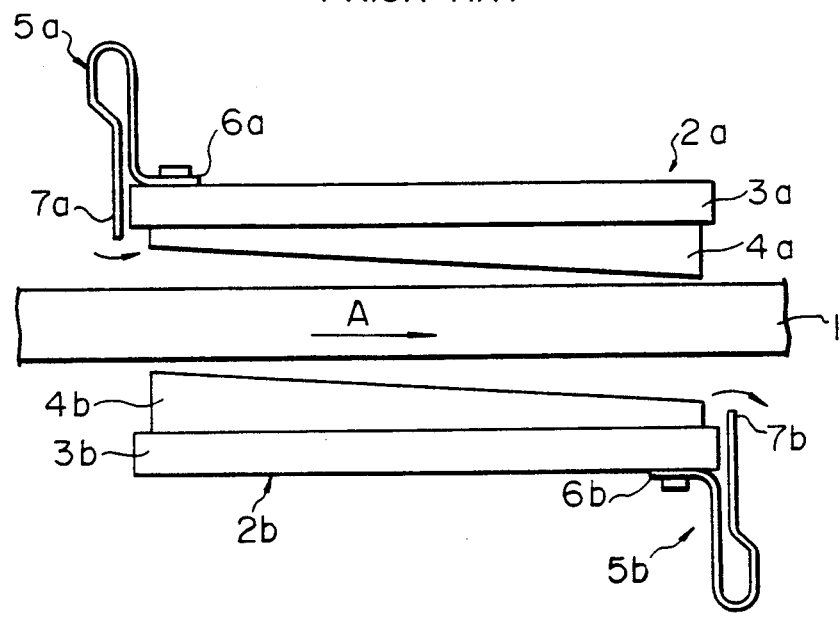
FIG. 1 is a plan view of a conventional disc brake.
Figure 2:
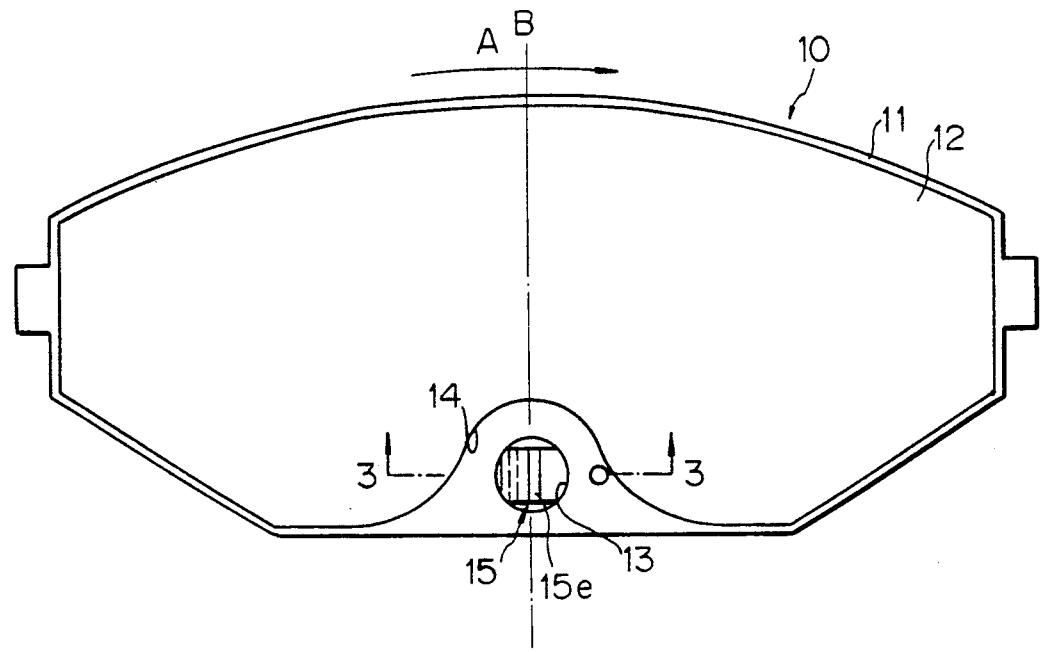
FIG. 2 is a front view of a first embodiment of the present invention.
Figure 3:
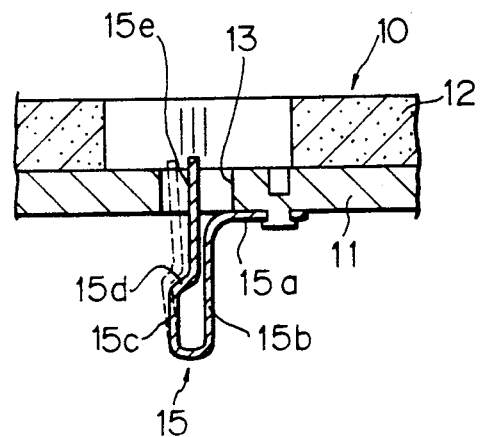
FIG. 3 is a sectional view taken along line 3—3 in FIG. 2.

Referring to FIGS. 2 and 3, a first embodiment of the present invention will be explained.

A friction pad 10 includes a backing plate 11 and a lining 12 adhered to the backing plate 11. A through-hole 13 is formed through the backing plate 11 near the lower edge thereof. The center of the hole 13 is located on a vertical center line B bisecting the lining in the widthwise direction thereof as viewed in the direction of rotation of a disc (not shown). The lining 12 is formed with a cutout portion 14 in order not to cover the through hole 13.

Reference numeral 15 designates a wear sensor or sensing member which is manufactured by bending an elongated plate such as a steel plate. The sensor 15 is provided with a first or flat base portion 15a, a second or rearward extension 15b extending rearwardly from one end of the base portion 15a, and a third or forward extension 15c bent in a U shape at the rear end of the second portion 15b and extending forwardly. The third portion 15c is provided with a crank-like shaped portion 15d formed at the middle thereof. The sensor 15 is mounted on the backing plate 11 with the base portion 15a fixedly secured to the rear surface of the backing plate 11 by, for example staking, riveting or the like. An end portion or sensing end 15e of the forward extension extends through the through hole 13 and projects beyond the front surface of the backing plate 11 into the cutout portion 14 of the lining 12 by a predetermined amount. The sensing end 15e extends through the through hole 13 generally along the center axis thereof. The diameter of the through hole 13 is such that the tip of the sensing end 15e still projects beyond the front surface of the backing plate 11 even when the forward extension 15c is greatly deflected and the sensing end 15e contacts the edge of the backing plate 11 defining the through-hole 13 as shown by the dotted line in FIGS. 2 and 3.

As is apparent from the above explanation, even when the sensor 15 is greatly drawn by the disc, the edge of the backing plate 11 defining the through-hole 13 acts to restrict excessive deflection of the sensor 15 and thereby prevents permanent deformation of the sensor 15. Thus, the sensor 15 surely generates a loud noise to notify the driver of the wear of the lining 12 when the sensor 15 is drawn by the disc.

Further, the sensor 15 senses the wear of the lining 12 at the middle portion thereof as viewed in the rotating direction A of the disc. Namely, the sensor 15 senses an average amount of wear over the contacting surface of the lining 12 which is considerably more than the amount of wear at the entrance side of an outer pad or at the exit side of an inner pad, which enables a reliable wear sensing operation to be performed. It is of course possible to use the same type of pad with the same type of sensor for both inner and outer pads.

Figure 4:
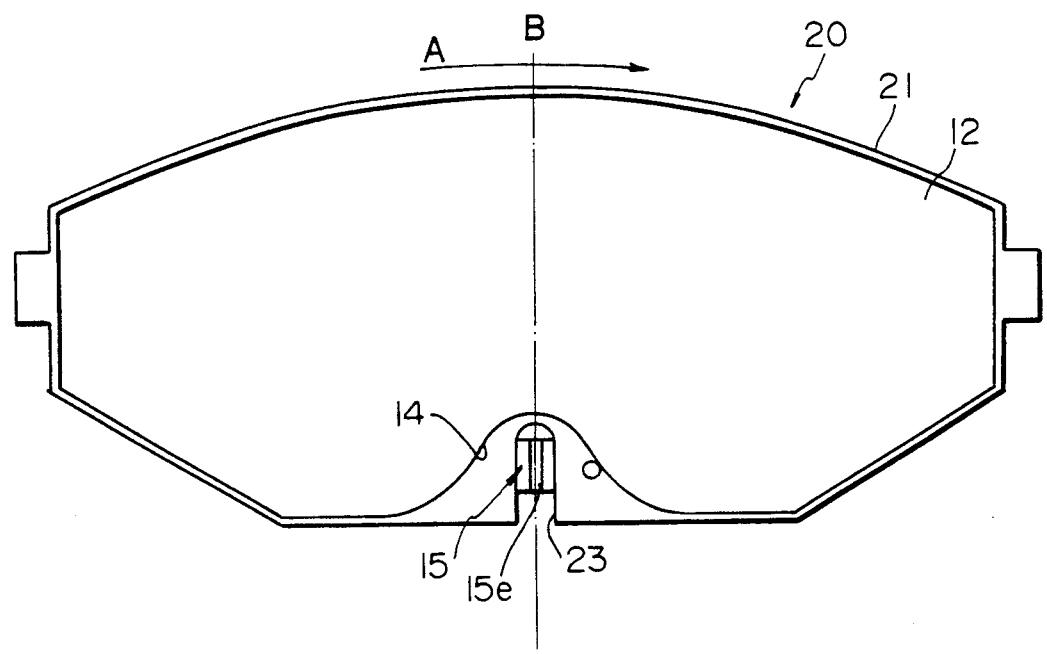
FIG. 4 is a front view of a second embodiment of the present invention.

FIG. 4 shows a second embodiment of the present invention.

A friction pad 20 comprises a backing plate 21 and a lining 12 adhered to the backing plate 21. The backing plate 21 is formed with a cutout 23 passing through the plate instead of the through-hole 13 in the first embodiment. The cutout 23 is located similarly to where the through-hole 13 is located in the first embodiment. The width of the cutout 23 and the length of a sensing end 15e of a sensor 15 are such that the tip of the sensing end 15e still projects beyond the front surface of the backing plate 21 even when the sensor 15 is greatly drawn and the sensing end 15e contacts the edge of the backing plate 21 defining the cutout 23.

The operation of the second embodiment is similar to that of the first embodiment and therefore, a detailed explanation thereof will be omitted.

Figure 5:
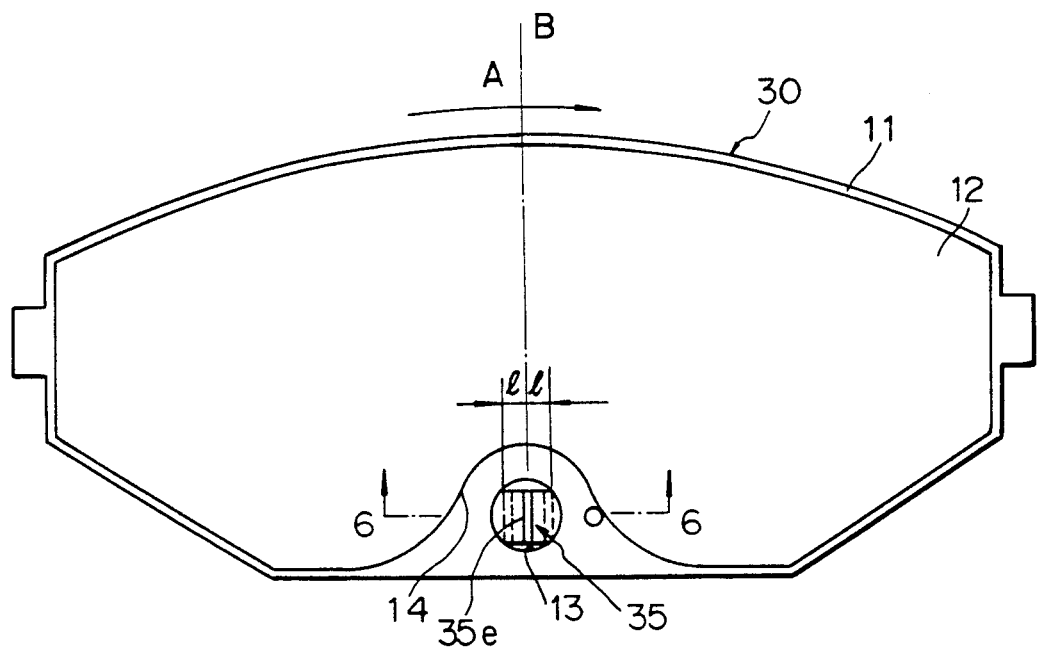
FIG. 5 is a front view of a third embodiment of the present invention.
Figure 6:
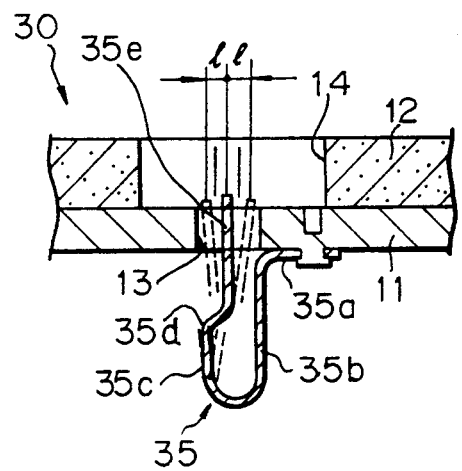
FIG. 6 is a sectional view taken along line 6—6 in FIG. 5.

FIGS. 5 and 6 show a third embodiment of the present invention.

A sensor 35 is manufactured and mounted on a backing plate 11 of a pad 30 in a generally similar way to that in the first embodiment.

This embodiment is characterized in that a sensing end 35e of the sensor 35 passes through through-hole 13 generally along the center axis of the through-hole 13 and that the maximum leftward deflection l of the sensing end 35e when the sensing end 35e is deflected leftward into contact with the edge of the backing plate 11 defining the hole 13 is the same as the maximum rightward deflection l of the sensing end 35e when the sensing end 35e is deflected rightward into contact with the edge of the backing plate 11 defining the hole 13. The sensor 35 is designed to generate the loudest noise when the sensing end 35e is deflected by "l". The tip of the sensing end 35e still projects beyond the front surface of the backing plate 11 even when it is deflected by "l".

The sensing end 35e is deflected by the same amount irrespective of the rotating direction of the disc to generate noise of the same maximum loudness. The sensor 35, therefore, generates a sufficiently loud noise both when the vehicle is advancing and when backing up.

Figure 7:
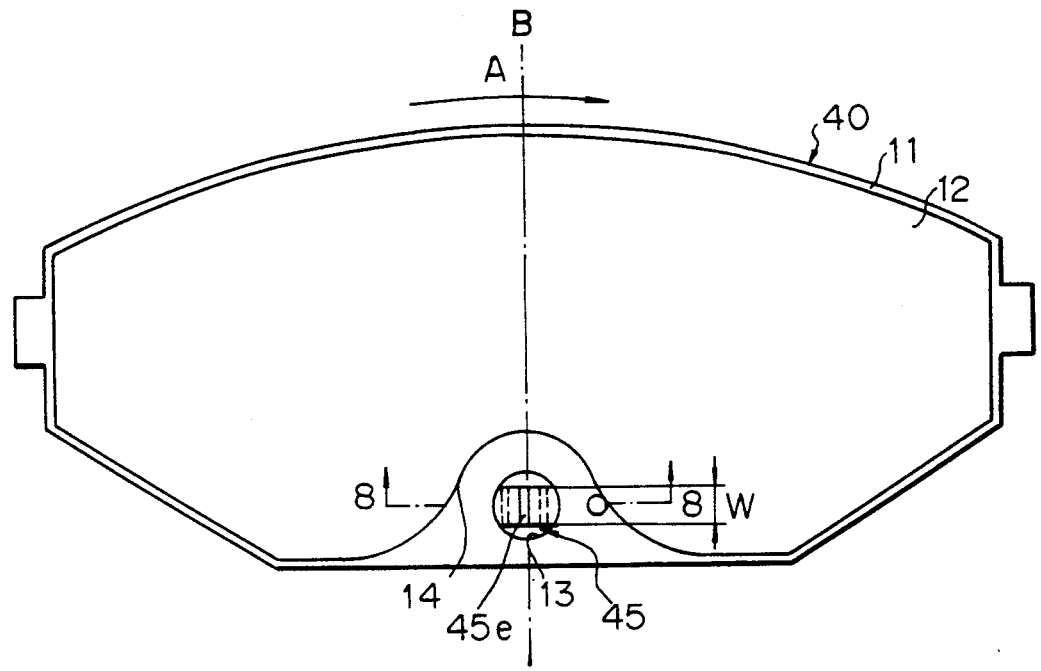
FIG. 7 is a front view of a fourth embodiment of the present invention.
Figure 8:
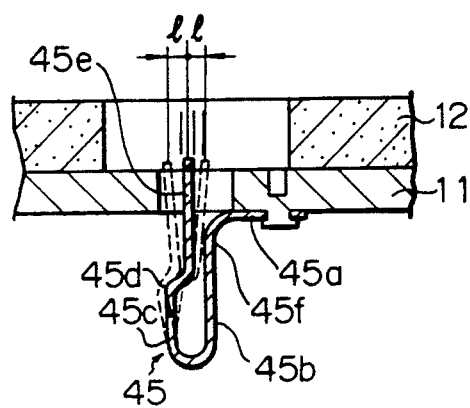
FIG. 8 is a sectional view taken along line 8—8 in FIG. 7.

FIGS. 7 and 8 show a fourth embodiment of the present invention.

In the third embodiment, the edge of the backing plate 11 defining the through-hole 13 acts to establish the maximum deflections of the sensing end 35e in opposite directions. The fourth embodiment is characterized in that the sensor itself is provided with a restricting portion for establishing the maximum deflection of the sensing end of the sensor in one direction.

Specifically, a sensor 45 is provided with a base portion 45a, a rearward extension 45b and a forward extension 45c. The sensor 45 is further provided with a restricting portion 45f between the base portion 45a and the rearward extension 45b as shown in FIG. 8. When the forward extension 45c is drawn leftward as viewed in FIG. 8 by a disc (not shown), excessive deflection of an end portion or sensing end 45e of the forward extension 45c is prevented by the edge of the backing plate 11 defining the through-hole 13, while rightward excessive deflection of the sensing end 45e is prevented by the restricting portion 45f when the forward extension 45c is drawn rightward by the disc.f In the present embodiment, the maximum deflection of the sensing end 45e can be determined independently from the diameter of the through-hole 13. In the case in which the maximum deflections of a sensing end of a sensor in the opposite directions are respectively established by the opposite edge portions of a backing plate defining a through-hole as in the third embodiment, and in the case in which the width W of the sensor must be made considerably narrower as compared with the diameter of the through-hole for some reason, the maximum deflection of the sensing end may be excessively large and the durability o the sensor may be deteriorated. The fourth embodiment advantageously obviates the problems with such cases.

It is to be noted that the maximum rightward deflection of the sensing end 45e is predetermined when the sensor 45 is manufactured and that, during assembly, it is only necessary to check the maximum leftward deflection of the sensing end, thereby improving assembly efficiency.

Figure 9:
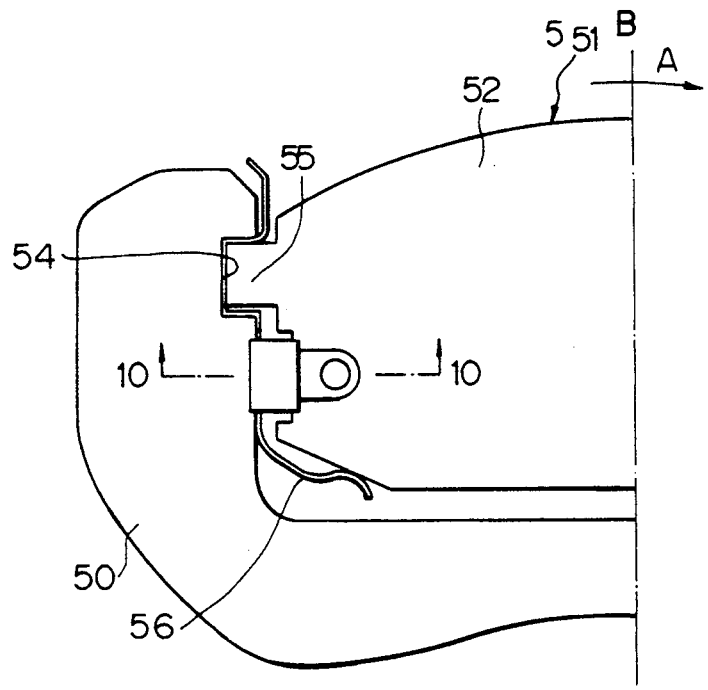
FIG. 9 is a partial front view of a fifth embodiment of the present invention.
Figure 10:
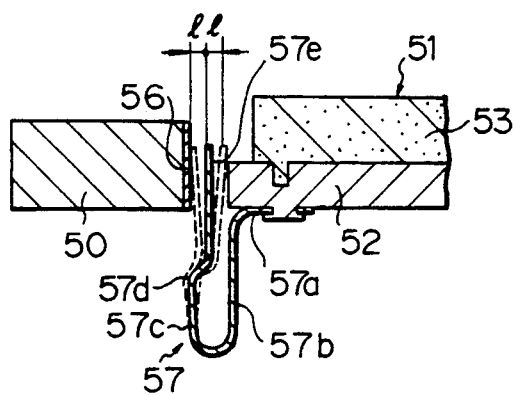
FIG. 10 is a sectional view taken along line 10—10 in FIG. 9.

Referring to FIGS. 9 and 10 a fifth embodiment of the invention will be explained.

Reference numeral 50 designates a carrier of a disc brake which axially slidably supports a pair of friction pads 51, only one of which is shown in the figures. The friction pad 51 comprises a backing plate 52 and a lining 53. The carrier 50 is provided with recessed portions 54 formed therein laterally opposing each other for receiving respective projections 55 formed on the friction pad 51 (only one each of the recessed portions 54 and the projections 55 are shown in the figures). Reference numeral 56 designates a pad spring for biasing the friction pad 51 upwardly as viewed in FIG. 9 to prevent the friction pad 51 from rattling.

A wear sensor or sensing member 57 has the same configuration as that of the sensor 35 employed in the third embodiment. The sensor 57 is fixedly mounted on the backing plate 52 by staking. An end portion or sensing end 57e of the sensor 57 is located centrally between the side of the backing plate 52 and the pad spring 56 opposite thereto. Since the tip of the sensing end 57e projects beyond the front surface of the backing plate 52, the sensing end is drawn by a rotating disc (not shown) when the lining 53 has become worn. The side of the backing plate 52 acts to prevent excessive deflection of the sensing end 57e when the disc rotates in the regular rotating direction while the pad spring 56 prevents an excessive deflection of the sensing end 57e when the disc rotates in the reverse direction. The amount of deflection in both directions is the same (=l). The sensor 57 is designed so as to generate the loudest noise when it is deflected by "l". When the disc brake is not provided with any pad spring, a side surface of the carrier 50 on which the pad spring 56 rests in the present embodiment can act to establish the maximum deflection of the sensing end 57e when the disc rotates in the reverse direction.

Figure 11:
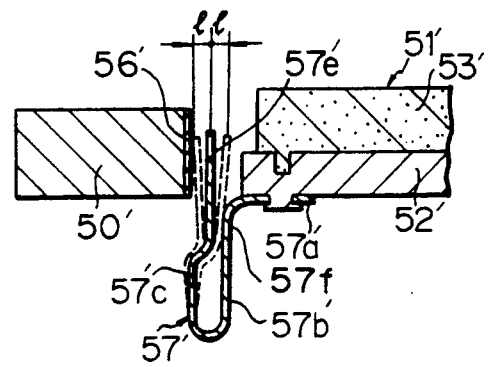
FIG. 11 is a sectional view of a variation of the fifth embodiment.

FIG. 11 shows a variation of the fifth embodiment. This variation is advantageous when there is an excessive distance between the side of a backing plate 52' and a pad spring 56'. A sensor 57' is generally similar to the sensor 45 employed in the fourth embodiment and is provided with a restricting portion 57f for establishing the maximum deflection of a sensing end 57e' when the sensing end 57e' is drawn by the disc in the regular rotating direction. The amount of deflection in the regular rotating direction is equal to that in the reverse direction where the maximum deflection of the sensing end 57e' is established by the pad spring 56'.

In the fourth embodiment and the variation of the fifth embodiment, the sensor 45 (57') is arranged such that the tip of the sensing end 45e (57e') can be displaced laterally by the maximum distance l in one of the opposite directions until the further deflection of the sensing end 45e (57e') is prevented by the backing plate 11 (52'). However, the sensor 45 (57') may be arranged such that a portion of the sensing end 45e (57e') at which the sensor is adapted to engage with the side of the backing plate 11 (52') is displaced laterally by the maximum distance l to engage with the side of the backing plate, thereby preventing the further deflection of the sensing end. In this case, the tip of the sensing end 45e (57e') is displaced by a distance "l'" which is quite a bit longer than distance "l". However, it can be said that distance "l'" is substantially equal to distance "l".

Figure 12:
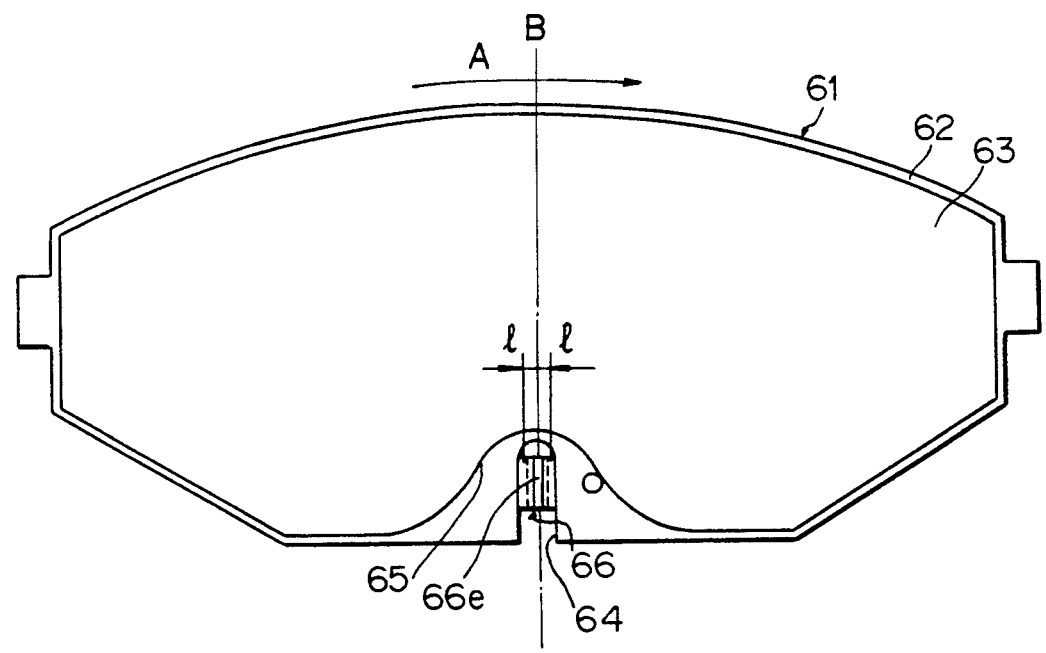
FIG. 12 is a front view of a sixth embodiment of the present invention.

FIG. 12 shows a sixth embodiment of the present invention. A friction pad 61 comprises a backing plate 62 and a lining 63 adhered to the backing plate 62. The backing plate 62 is formed with a cutout 64 as shown in the figure. The cutout 64 extends along a vertical center line B which bisects the lining 63 in the widthwise direction thereof as viewed in the rotating direction of a disc (not shown). The lining 63 is provided with a cutout 65 in order not to cover the cutout 64 of the backing plate 62. A sensor 66 is mounted on the backing plate 62 in a manner similar to that in the aforementioned embodiments. A sensing end 66e of the sensor 66 is located along the center line B so that the maximum deflections (l) of the sensing end 66e in the opposite directions are equal. The tip of the sensing end 66e still projects beyond the front surface of the backing plate 62 when the sensing end 66e engages with either of the edges of the backing plate defining the sides of the cutout 64.

What is claimed is:

1. A friction pad for use in a disc brake and adapted to be forcedly pressed onto a rotating disc to generate a braking force, said friction pad comprising:

a backing plate having front and rear surfaces, and having an open portion therethrough, said open portion defined by an inner wall surface of the backing plate extending between said front and said rear surfaces;

a lining fixedly attached to said front surface of said backing plate, the open portion of said backing plate being generally located on a center line bisecting said lining in the widthwise direction thereof, said lining being configured to extend around the open portion of said backing plate; and a wear sensor for sensing a limit of wear of said lining, said wear being mounted on the rear surface of said backing plate, said wear sensor comprising an elongate bent metal strip including an extending portion passing through the open portion of said backing plate out of contact with the inner wall surface of said backing plate and projecting beyond said front surface of said backing plate, the extending portion of said sensor terminating at a tip thereof, and the amount by which the extending portion of said sensor projects beyond the front surface of said backing plate and the distance between said extending portion and an edge of the backing plate defined between said front surface and said inner wall surface of said backing plate being such that said tip projects beyond the front surface of said backing plate when the sensor is deflected into engagement with said edge.

2. A friction pad according to claim 1, wherein said sensor includes a base portion fixedly secured to the rear surface of said backing plate, a rearward extension extending rearwardly from one end of said base portion, and a third extension having a U shaped part at the remote end of said rearward extension.

3. A friction pad according to claim 1, wherein said open portion of the backing plate is a circular through-hole.

4. A friction pad according to claim 1, wherein said open portion of the backing plate is a recess extending inwardly from the periphery of the backing plate.

5. A disc brake comprising:

a rotating disc;

a friction pad adapted to be forcedly pressed onto said disc to generate a braking force, said friction pad including a backing plate having front and rear surfaces, and having an open portion therethrough, said open portion defined by an inner wall surface of the backing plate extending between said front and said rear surfaces;

a lining fixedly attached to the front surface of said backing plate, the open portion of said backing plate being generally located on a center line bisecting said lining in the widthwise direction thereof, said lining being configured to extend around the open portion of said backing plate; and a wear sensor for sensing a limit of wear of said lining, said wear sensor being mounted on the rear surface of said backing plate, said wear sensor comprising an elongate bent metal strip including an extending portion passing through the open portion of said backing plate out of contact with the inner wall surface of said backing plate and projecting beyond said front surface of said backing plate, the extending portion of said wear sensor terminating at a tip thereof, said sensor being deflectable in opposite directions corresponding, respectively, to rotating directions of said disc; and means for limiting the maximum deflection of said sensor in said opposite directions to substantially equal amounts.

6. A disc brake according to claim 5, wherein said limiting means includes a restricting portion of said sensor for establishing the maximum deflection of deflection of said sensor in one of said opposite directions.

7. A disc brake according to claim 6, wherein said restricting portion is spaced from said extending portion in said one of said opposite directions so as to engage with said extending portion when said extending portion is deflected in said one of the opposite directions, thereby establishing the maximum amount of deflection of said sensor in said one of the opposite directions.

8. A disc brake according to claim 6, wherein said limiting means further includes an edge of said backing plate defined between said front surface and said inner wall surface of said backing plate, a portion of said edge being spaced from said extending portion in the other of said opposite directions so as to engage therewith to establish the maximum amount of deflection of said sensor in the other of said opposite directions.

9. A disc brake according to claim 8, wherein said open portion is a circular through-hole.

10. A disc brake according to claim 5, wherein the amount by which the extending portion of said sensor projects beyond the front surface of said backing plate and the distance between said extending portion and an edge of the backing plate defined between said front surface and said inner wall surface of said backing plate being such that said tip projects beyond the front surface of said backing plate when the sensor is deflected into engagement with said edge.

11. A disc brake comprising:

a rotating disc;

a friction pad including a backing plate having front and rear surfaces and a lateral side surface extending between said front and said rear surfaces, and a lining fixedly attached to the front surface of said backing plate;

a carrier for supporting said friction pad slidably in the axial direction of said disc, said carrier having a surface opposing the lateral side surface of said backing plate with a clearance defined therebetween; and a wear sensor for sensing a limit of wear of said lining, said wear sensor being mounted on the rear surface of said backing plate, said sensor comprising an elongate bent metal strip including an extending portion and a restricting portion, said extending portion passing through the clearance between said lateral side surface of the backing plate and said surface of the carrier and out of contact therewith, said extending portion projecting beyond the front surface of said backing plate and deflectable in opposite directions, said restricting portion being spaced from said extending portion in one of said opposite directions so as to engage said extending portion when said extending portion is deflected in said one of the opposite directions thereby establishing a maximum amount of deflection of the extending portion in said one of said opposite directions, said surface of the carrier being spaced from said extending portion of the sensor so as to engage therewith when the extending portion is deflected in the other of said opposite directions thereby establishing a maximum amount of deflection of the extending portion in the other of said opposite directions, and said maximum amounts of deflection being generally equal.

12. A disc brake as claimed in claim 11, wherein said carrier includes a plate spring biasing said friction pad in an upward direction perpendicular to the axial direction of said rotating disc, said plate spring forming said surface of said carrier opposing the lateral surface of said backing plate.

* * * * *